US012634765B2

(12) United States Patent
    Suzuki et al.

(10) Patent No.:  US 12,634,765 B2
(45) Date of Patent:      May 19, 2026

(54) WIRELESS COMMUNICATION DEVICE, COMMUNICATION CONTROL METHOD AND NON-TRANSITORY COMPUTER-READABLE STORAGE MEDIUM

(71) Applicant: YAMAHA CORPORATION, Hamamatsu (JP)

(72) Inventors: Shuntaro Suzuki, Shizuoka (JP); Hirokazu Suzuki, Yokohama (JP)

(73) Assignee: YAMAHA CORPORATION, Hamamatsu (JP)

( * ) Notice:    Subject to any disclaimer, the term of this patent is extended or adjusted under 35 U.S.C. 154(b) by 600 days.

(21) Appl. No.: 18/071,949

(22) Filed:      Nov. 30, 2022

(65)              Prior Publication Data
       US 2023/0189080 A1      Jun. 15, 2023

(30)        Foreign Application Priority Data
   Dec. 15, 2021    (JP) ................................. 2021-203438

(51) Int. Cl.
    *H04W 28/22*        (2009.01)
    *H04L 43/0894*      (2022.01)
(52) U.S. Cl.
    CPC ......... *H04W 28/22* (2013.01); *H04L 43/0894* (2013.01)
(58) Field of Classification Search
    CPC . H04L 43/0876; H04L 43/0894; H04L 43/16; H04L 47/22; H04W 28/22; Y02D 30/20
    See application file for complete search history.

(56)              References Cited

U.S. PATENT DOCUMENTS

| | | | | |
|---|---|---|---|---|
| 2012/0314595 A1* | 12/2012 | Oikawa | ..................... | H04L 1/18 |
| | | | | 370/252 |
| 2019/0342799 A1* | 11/2019 | MacKenzie | ....... | H04W 36/0007 |
| 2022/0182887 A1* | 6/2022 | Nakahira | .............. | H04W 72/30 |
| 2022/0232425 A1* | 7/2022 | Nakahira | ................ | H04W 4/06 |
| 2024/0298380 A1* | 9/2024 | Wang | ..................... | H04W 4/06 |

FOREIGN PATENT DOCUMENTS

| | | |
|---|---|---|
| JP | 2007329612 A | 12/2007 |
| JP | 2020167451 A | 10/2020 |

OTHER PUBLICATIONS

Office Action issued in Japanese Appln. No. 2021-203438 mailed Jul. 8, 2025.

* cited by examiner

*Primary Examiner* — Donald L Mills

(74) *Attorney, Agent, or Firm* — ROSSI, KIMMS & McDOWELL LLP

(57)              ABSTRACT

A wireless communication device comprising a communication unit configured to communicate with a wireless communication terminal using a first method to transmit data that is receivable by the wireless communication terminal or a second method, different from the first method, to transmit data that is simultaneously receivable by a plurality of wireless communication terminals including the wireless communication terminal, a processor, and a memory configured to store a program, the program being executable by the processor to cause processor to change a communication rate of the second method based on information indicating an amount of communications traffic of the second method in each of a plurality of unit periods of time is provided. Accordingly, an appropriate multicast transmission rate can be automatically determined.

15 Claims, 6 Drawing Sheets

FIG. 6

| Time | Proportion of amount of communications traffic of second method (%) | Time | Proportion of amount of communications traffic of second method (%) |
|---|---|---|---|
| 3:00 | 0 | 15:00 | 80 |
| 3:30 | 0 | 15:30 | 70 |
| 4:00 | 0 | 16:00 | 60 |
| 4:30 | 0 | 16:30 | 50 |
| 5:00 | 0 | 17:00 | 40 |
| 5:30 | 0 | 17:30 | 30 |
| 6:00 | 10 | 18:00 | 20 |
| 6:30 | 20 | 18:30 | 10 |
| 7:00 | 30 | 19:00 | 10 |
| 7:30 | 40 | 19:30 | 0 |
| 8:00 | 50 | 20:00 | 0 |
| 8:30 | 60 | 20:30 | 0 |
| 9:00 | 70 | 21:00 | 0 |
| 9:30 | 80 | 21:30 | 0 |
| 10:00 | 90 | 22:00 | 0 |
| 10:30 | 90 | 22:30 | 0 |
| 11:00 | 90 | 23:00 | 0 |
| 11:30 | 90 | 23:30 | 0 |
| 12:00 | 90 | 0:00 | 0 |
| 12:30 | 90 | 0:30 | 0 |
| 13:00 | 90 | 1:00 | 0 |
| 13:30 | 90 | 1:30 | 0 |
| 14:00 | 90 | 2:00 | 0 |
| 14:30 | 90 | 2:30 | 0 |

1

WIRELESS COMMUNICATION DEVICE, COMMUNICATION CONTROL METHOD AND NON-TRANSITORY COMPUTER-READABLE STORAGE MEDIUM

CROSS-REFERENCE TO RELATED APPLICATIONS

This application claims the benefit of priority to Japanese Patent Application No. 2021-203438, filed on Dec. 15, 2021, the entire contents of which are incorporated herein by reference.

FIELD

The present disclosure relates to a wireless communication device, a communication control method, and a program.

BACKGROUND

Wireless communication, such as a wireless LAN (Local Area Network) using a communication band in a 2.4 GHz band or a 5 GHz band, can be classified into three communication methods, a unicast method, a multicast method, and a broadcast method, depending on the numbers of nodes (that is, communication partners) that communicate simultaneously. The unicast method is a data communication method that is performed on a one-to-one basis by specifying a single address. The unicast method is used, for example, for browsing a Web website, transmitting and receiving mail, and the like. The multicast method is a data communication method in which at least one specific address is designated and the data communication method is performed on one-to-a plurality. The multicast method is used, for example, for streaming such as video streaming and music streaming. The broadcast method is a data communication method in which all destinations in the same network are designated and are performed in a one-to-unspecified number. The broadcast method is used for exchanging control data that does not specify a communication partner, searching for a communication partner, and the like.

In the unicast method, since the reception confirmation is performed between the transmitting side and the receiving side, the communication rate can be optimized based on the reception response from the receiving side. On the other hand, in the multicast method and the broadcast method, since there is a plurality of reception sides, reception confirmation is not performed between the transmission side and the reception sides, and it is not possible to optimize the communication rate based on the reception response from the reception sides. Japanese laid-open patent publication No. 2020-167451 discloses selecting the communication rate of communication of the multicast method and the broadcast method based on wireless communication information in the case of performing communication of a unicast method.

SUMMARY

According to an embodiment of the present disclosure, there is provided a wireless communication device comprising a communication unit configured to communicate with a wireless communication terminal using a first method to transmit data that is receivable by the wireless communication terminal or a second method, different from the first method, to transmit data that is simultaneously receivable by a plurality of wireless communication terminals including the wireless communication terminal, a processor, and a memory configured to store a program, the program being executable by the processor to cause processor to change a communication rate of the second method based on information indicating an amount of communications traffic of the second method in each of a plurality of unit periods of time.

According to another embodiment of the present disclosure, there is provided a communication control method, executed by a wireless communication device, comprising communicating with a wireless communication terminal using a first method to transmit data that is receivable by the wireless communication terminal or a second method, different from the first method, to transmit data that is simultaneously receivable by a plurality of wireless communication terminals including the wireless communication terminal, and changing a communication rate of the second method based on information indicating an amount of communications traffic of the second method in each of a plurality of unit periods of time.

According to still another embodiment of the present disclosure, there is provided a non-transitory computer-readable storage medium having stored thereon a program for causing a computer to execute operations comprising communicating with a wireless communication terminal using a first method to transmit and receive data that is receivable by the wireless communication terminal or a second method, different from the first method, to transmit data which can be received that is simultaneously receivable by a plurality of wireless communication terminals including the wireless communication terminal simultaneously, and changing a communication rate of the second method based on information indicating an amount of communications traffic of the second method in each of a plurality of unit periods of time.

BRIEF DESCRIPTION OF DRAWINGS

FIG. 6 is an example of a proportion of the amount of communications traffic of the second method recorded from the start of the communication control process.

DESCRIPTION OF EMBODIMENTS

Figure 1:
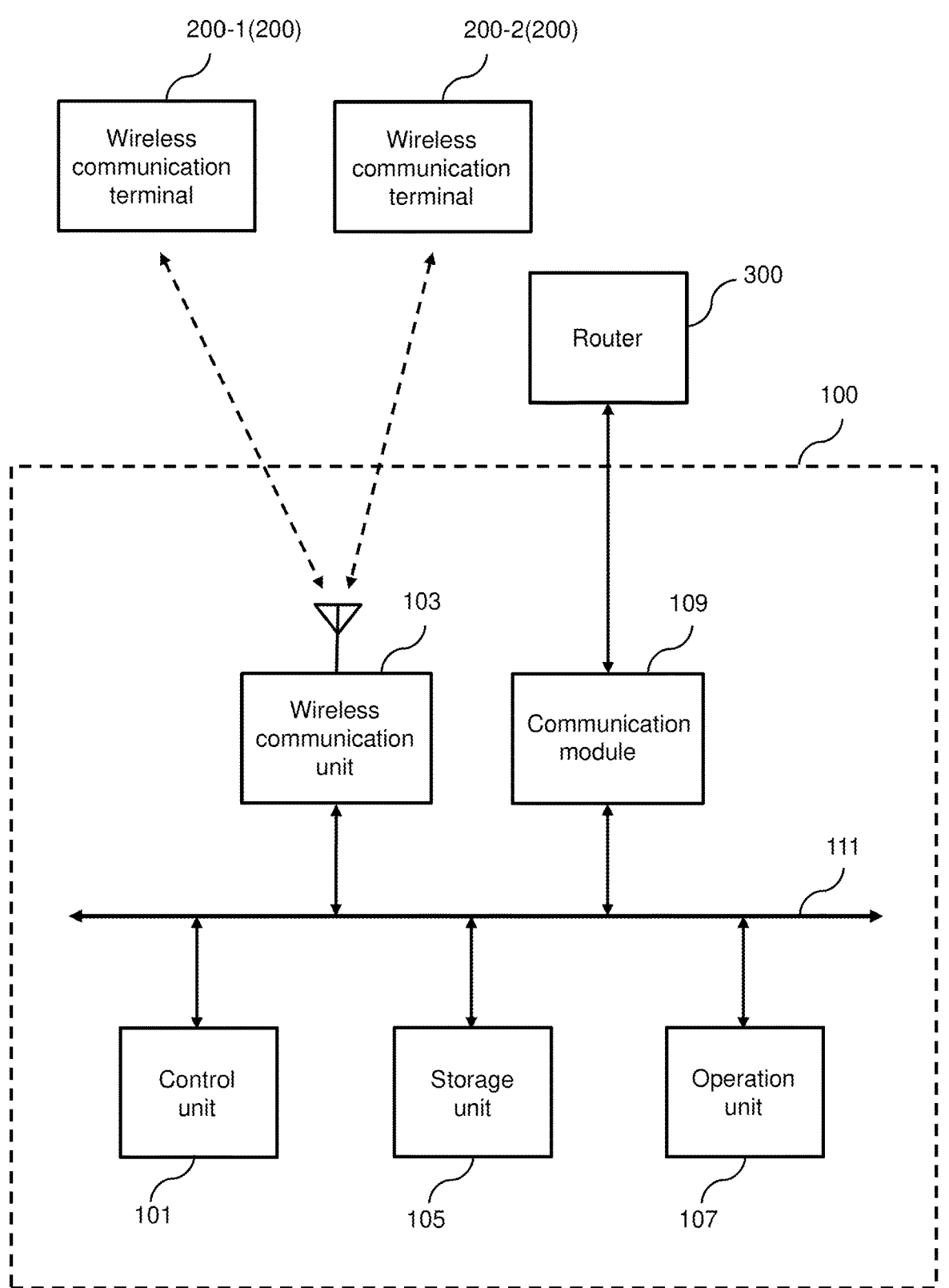
FIG. 1 is a diagram illustrating a configuration of a communication system according to an embodiment of the present disclosure.

In a wireless communication system, it is possible to set a multicast transmission rate which is a rate of a multicast frame and a broadcast frame (multicast/broadcast frame) transmitted by a wireless communication device. In a case where the multicast transmission rate is reduced, it is possible to increase a communicable distance between the wireless communication system and the wireless communication terminal. On the other hand, in the case where the multicast transmission rate is reduced, among the communication between the unicast method and the multicast/broadcast method executed in the wireless communication system, a proportion of an air time occupied by the multicast/broadcast frame increases, and the throughput of the unicast frame decreases.

When setting a multicast transmission rate, it is necessary to set an appropriate multicast transmission rate according to a usage environment such as an air time occupied by a multicast/broadcast frame in communication, but it is difficult for a user to know a radio environment to be used by himself/herself. Therefore, it is difficult to determine how to determine the multicast transmission rate, and it is very complicated for the user to set the multicast transmission rate by himself/herself.

According to the present disclosure, an appropriate multicast transmission rate can be automatically determined.

Hereinafter, embodiments of the present disclosure will be described with reference to the drawings and the like. However, the present disclosure can be implemented in many different aspects, and should not be construed as being limited to the description of the embodiments exemplified below.

The drawings may be schematically represented for clarity of explanation, but are merely examples, and do not limit the interpretation of the present invention. Further, the numbers appended with "first" and "second" for each element are convenience labels used to distinguish each element, and do not have any further meaning unless otherwise described. It should be noted that no particular explanation shall be given if the person ordinarily skilled in the art in the field to which the present invention belongs is recognizable.

<Communication System>

A communication system of the present disclosure will be described in detail with reference to the drawings. The communication system according to the present embodiment is realized by an access point that relays wireless communication. The access point may automatically determine an appropriate multicast transmission rate according to the usage environment of the user and change the multicast transmission rate to the determined multicast transmission rate according to the method described below. Hereinafter, an access point according to the present embodiment will be described. Note that the communication system may be realized by another communication device such as a router or a network switch instead of the access point.

In the following description, "transmission rate" means a frame rate at which a wireless communication device transmits. "Reception rate" means a frame rate at which a wireless communication terminal receives a frame transmitted from a wireless communication device. The "communication rate" is used in a case where the transmission rate and the reception rate are not distinguished from each other.

FIG. 1 is a diagram illustrating a configuration of a communication system 10 according to an embodiment of the present disclosure. The communication system 10 includes an access point 100 and wireless communication terminals 200 (200-1, 200-2). The communication system 10 may include a router 300.

The access point 100 provides the wireless communication terminal 200 with an environment of wireless LAN. In addition, the access point 100 can relay connections to WAN (Wide Area Network) and the internet from the wireless communication terminal 200 via the router 300. Although two wireless communication terminals 200-1 and 200-2 are illustrated in FIG. 1, it is sufficient that one or more wireless communication terminals 200 exist in the communication system 10. Hereinafter, in a case where it is not necessary to distinguish between the individual wireless communication terminals 200-1 and 200-2, a description will be simply given as the wireless communication terminal 200.

The access point 100 includes a control unit 101, a wireless communication unit 103, a storage unit 105, and an operation unit 107. The access point 100 may include a communication module 109. The components of the access point 100 are connected to each other by a bus 111.

The control unit 101 includes arithmetic processing circuitry such as a CPU and a memory. The control unit 101 executes a control program stored in the storage unit 105 by a CPU to realize various functions of the access point 100. The realized functions include a communication control function. According to this communication control function, it is possible to execute a communication control process to be described later. Note that the function realized by the control unit 101 includes a function of controlling each unit constituting the access point 100 in addition to the above-described communication control function. Part or all of the configuration for realizing these functions is not limited to the case where the configuration is realized by software by executing a program, and may be realized by hardware.

The control program should be executed by a computer, and may be provided in a state of being stored in a computer-readable recording medium such as a magnetic recording medium, an optical recording medium, a magneto-optical recording medium, or a semiconductor memory. In this case, the access point 100 may include a device that reads the recording medium. The control program may be downloaded from the outside via a network.

The wireless communication unit (communication unit) 103 wirelessly communicates with the wireless communication terminal 200. Specifically, the wireless communication unit 103 wirelessly communicates with the wireless communication terminal 200 by the unicast method, the multicast method, or the broadcast method based on a communication parameter including a communication rate set by the control unit 101, and transmits and receives frames (data). In addition to the communication rate, the communication parameters may include a bandwidth used for communication, a number of transmission streams, and the like. The wireless communication unit 103 is capable of using communication bands of both 2.4 GHz band and 5 GHz band.

The storage unit 105 is a storage device such as a non-volatile memory, a hard disk, a RAM, and the like. As the storage unit 105, in addition to a semiconductor memory such as an SSD (Solid State Drive), a magnetic recording medium (a magnetic tape, a magnetic disk, or the like), an optical recording medium, a magneto-optical recording medium, or an element which is storage medium that can be stored is used. The storage unit 105 has a function as a database that stores application programs for realizing a communication control function executed by the control unit 101 and other functions, various kinds of information, and the like. The application program may be downloaded from the outside via a network. Further, the storage unit 105 may be externally present. The storage unit 105 stores threshold data of an amount of communications traffic by communication of a multicast method and a broadcast method, which will be described later.

The operation unit 107 includes an operation element such as a power button, a setting button and the like. The operation unit 107 receives a user's operation on the operation element, and outputs a signal corresponding to the operation to the control unit 101.

In the present embodiment, the communication module 109 communicates with the router 300 and communicates with other devices via the router 300. The communication may be wireless communication or wired communication.

<Communication Control Processing>

A communication control process executed by the control unit 101 will be described. In the following description, in the communication with the wireless communication terminal 200 by the wireless communication unit 103 of the access point 100, the communication using the unicast method is referred to as the communication using the first method, the communication using the multicast method, or the communication using the broadcast method is referred to as the communication using the second method. In the communication using the first method, the access point 100 and the wireless communication terminal transmit and receive frames (data) on a one-to-one basis. In the communication using the second method, the access point 100 transmits a frame (data) that can be simultaneously received by a plurality of wireless communication terminals 200 to the plurality of wireless communication terminals 200. In addition, an amount of communications traffic by the communication using the first method is referred to as an amount of communications traffic of the first method, and the amount of communications traffic by the communication using the second method is referred to as an amount of communications traffic of the second method.

The control unit 101 changes the transmission rate of the communication using the second method based on the information indicating the amount of communications traffic of the second method in each of a plurality of unit periods of time. In the present embodiment, the transmission rate of the communication using the second method is changed by using the ratio between the amount of communications traffic of the first method and the amount of communications traffic of the second method in each of the plurality of unit periods of time as the information indicating the amount of communications traffic of the second method in each unit period of time. The communication control process executed by the control unit 101 includes a process for changing the transmission rate of the communication using the second method based on the ratio between the amount of communications traffic of the first method and the amount of communications traffic of the second method in a predetermined unit period of time.

Figure 2:
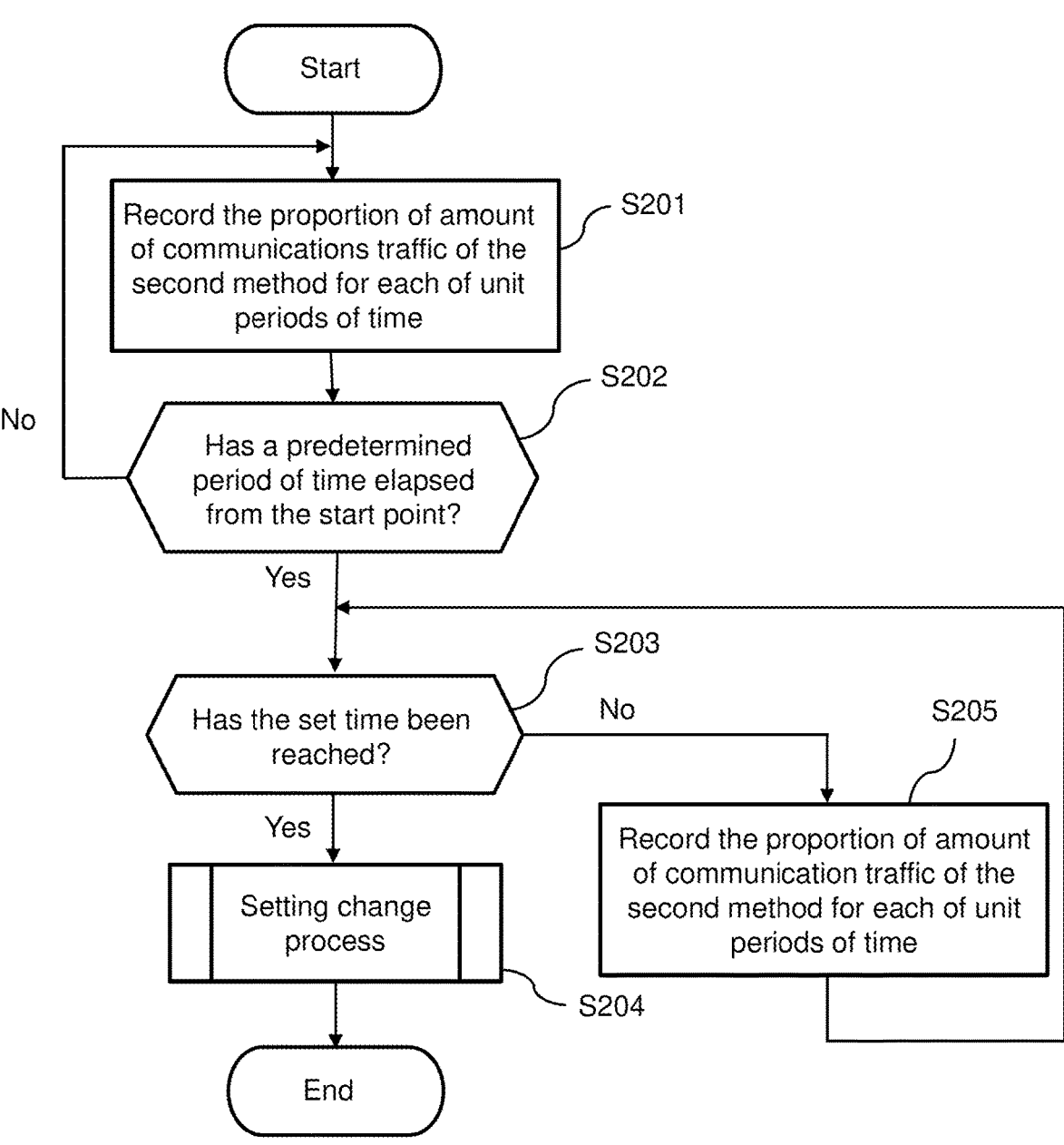
FIG. 2 is a flowchart showing a communication control process according to an embodiment of the present disclosure.

FIG. 2 is a flowchart showing a communication control process according to the present embodiment. In the present embodiment, when the communication control process is started, the control unit 101 records the proportion of the amount of communications traffic of the second method in each of the plurality of unit periods of time (a seconds) from the start point (S201). The proportion of the amount of communications traffic of the second method in each of the plurality of unit periods of time can be obtained by calculating the proportion of the amount of communications traffic of the second method to a total of the amount of communications traffic of the first method and the amount of communications traffic of the second method in each of the plurality of unit periods of time. The proportion of the amount of communications traffic of the second method calculated by the control unit 101 may be temporarily stored in the storage unit 105.

In the present embodiment, the ratio between the amount of communications traffic of the first method and the amount of communications traffic of the second method in each unit period of time is not limited to the proportion of the amount of communications traffic of the second method in each unit period. For example, the proportion of an air time of the communication using the second method (an air time occupancy rate) in the communication using the first method and the communication using the second method in each unit period of time may be considered as the ratio between the amount of communications traffic of the first method and the amount of communications traffic of the second method. Further, for example, the ratio between a number of arrival of frames that does not depend on the frame size of the communication using the first method and a number of arrival of frames that does not depend on the frame size of the communication using the second method in each unit period of time may be used instead of the ratio between the amount of communications traffic of the first method and the amount of communications traffic of the second method.

Subsequently, the control unit 101 determines whether or not a predetermined period of time (b seconds) has elapsed from the start point (S202). When the predetermined period of time (b seconds) has elapsed from the starting time (S202; Yes), the control unit 101 determines whether or not the set time has been reached (S203). The set time is a predetermined time at which the transmission rate of the second method is changed. The set time may be a predetermined time in a day, and can be appropriately set by the user.

When the set time is reached (S203; Yes), the control unit 101 executes a setting change process (S204). On the other hand, if the set time has not been reached, the control unit 101 continues recording the proportion of the amount of communications traffic of the second method in each of the plurality of unit periods of time (a seconds) until the set time has been reached (S205).

Figure 3:
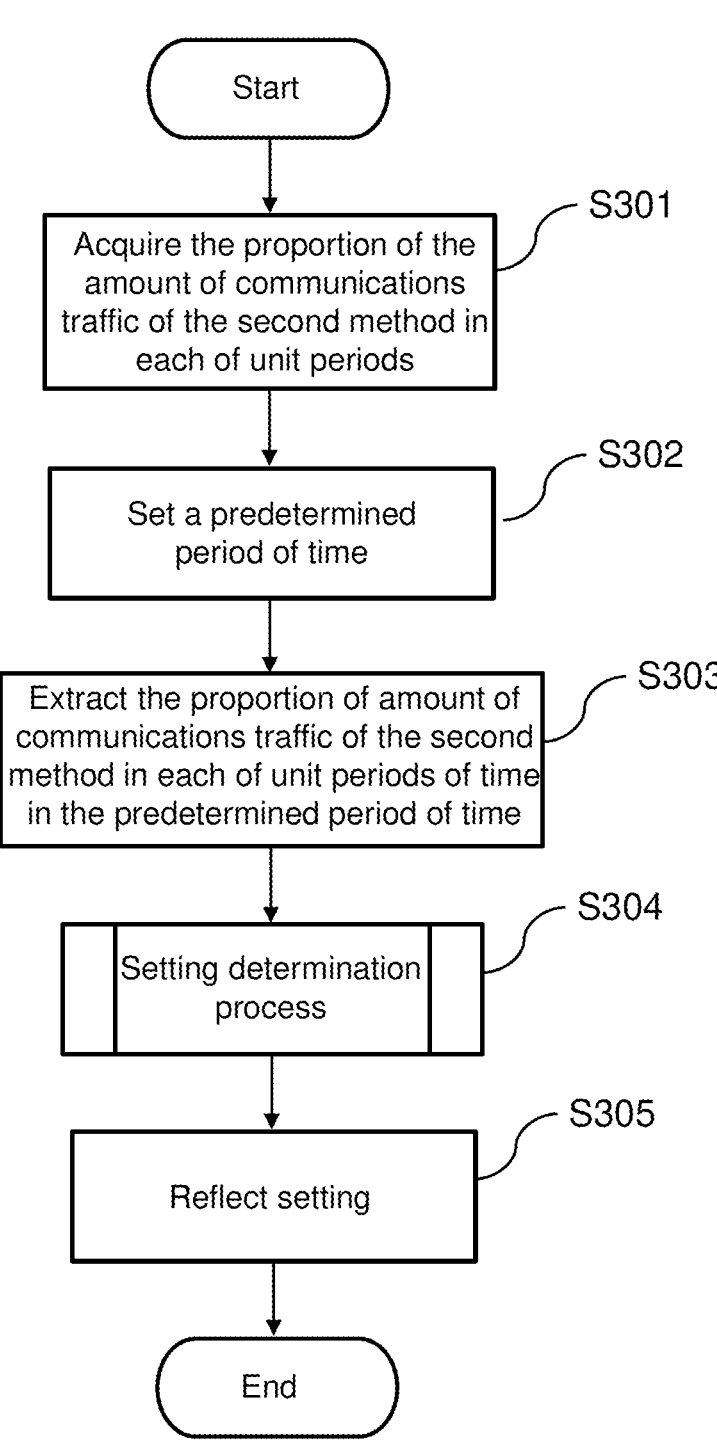
FIG. 3 is a flowchart showing a setting change process according to an embodiment of the present disclosure.

FIG. 3 is a flowchart showing the setting change processing shown in FIG. 2. The setting change process is a process for changing the setting of a next transmission rate of the communication using the second method. The control unit 101 changes the setting of the communication using the second method including the transmission rate based on the proportion of the amount of communications traffic of the second method in each unit period of time.

When the setting change process is started, the control unit 101 acquires the proportion of the amount of communications traffic of the second method in each of the plurality of unit periods of time (a seconds) (S301).

Next, the control unit 101 sets a predetermined period of time based on the unit period of time (specifically, the time length of the unit period of time) and the proportion of the amount of communications traffic of the second method in each of the plurality of unit periods of time acquired by S301 process (S302). The control unit 101 extracts a predetermined number of unit periods of time in which the proportion of the amount of communications traffic of the second method in each unit period of time is relatively large, and sets the extracted unit periods of time as a predetermined period of time. The number of extracted unit periods of time may be two or more, and may be appropriately set by the user. The unit periods of time included in the predetermined period of time may be continuous or discontinuous. The predetermined period of time is a period of time considered for determining a transmission rate of the communication using the second method.

Next, the control unit 101 extracts a proportion of the amount of communications traffic of the second method in each of the plurality of unit periods of time included in the predetermined period of time set by S302 process (S303).

Next, the control unit 101 performs a setting determination process based on the proportion of the amount of communications traffic of the second method in each of the plurality of unit periods of time included in the predetermined period of time extracted by the process of S303 (S304). After that, the control unit 101 reflects settings determined by the setting determination process of S304 in the transmission rate of the second method to be set next (S305), and finishes the series of processing.

Figure 4:
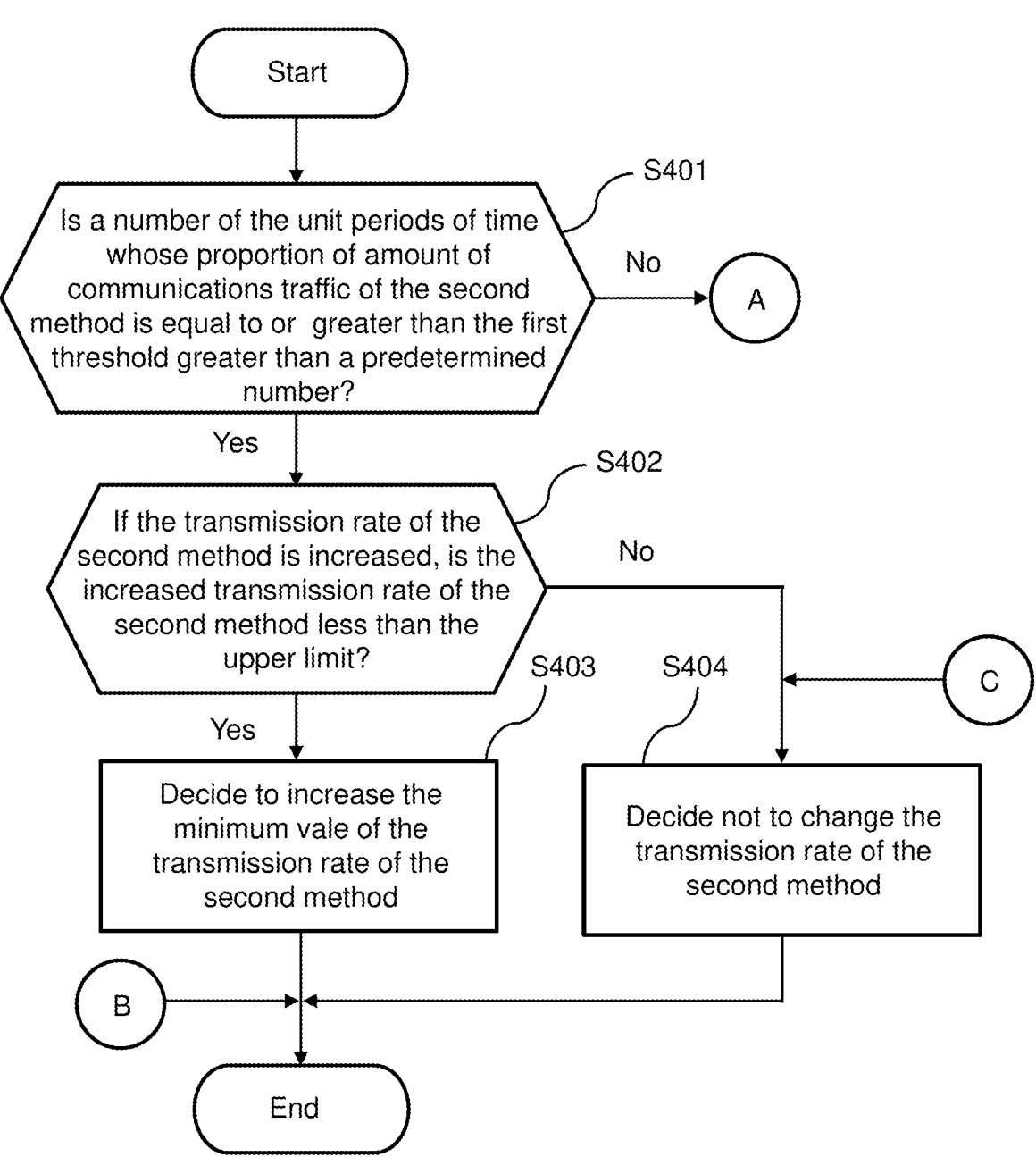
FIG. 4 is a flowchart showing a setting determination process according to an embodiment of the present disclosure.
Figure 5:
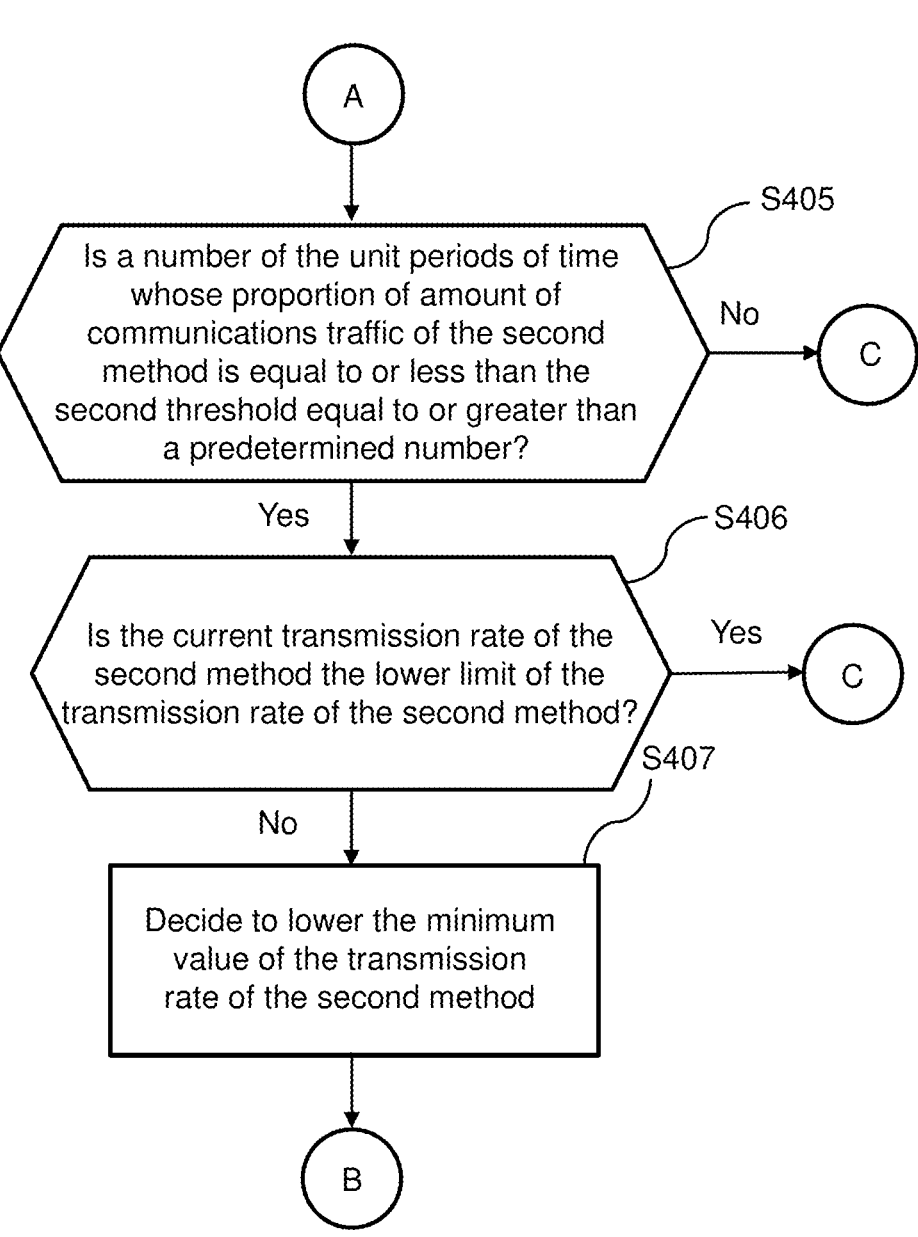
FIG. 5 is a flowchart showing a setting determination process according to an embodiment of the present disclosure.

FIG. 4 and FIG. 5 are flowcharts showing the setting determination processing shown in FIG. 3. The setting determination process is a process for determining a transmission rate of the second method to be set next.

The control unit 101 compares the proportion of the amount of communications traffic of the second method of each of the plurality of unit periods of time included in the predetermined period of time extracted by the process of S303 with a first threshold, and determines whether or not a number of the unit periods of time in which the proportion of the amount of communications traffic of the second method is equal to or greater than the first threshold is equal to or greater than the predetermined number (S401). The first threshold is a value indicating a predetermined proportion of the amount of communications traffic of the second method. The first threshold can be appropriately set by the user. In addition, the predetermined number of the unit periods of time to be compared may be set in advance, or may be set as appropriate by the user.

In a case where the number of the unit periods of time, included in the predetermined period of time, in which the proportion of the amount of communications traffic of the second method is equal to or greater than the first threshold is equal to or greater than the predetermined number (S401; Yes) as a result of the determination in the process of S401, the control unit 101 determines whether or not an increased transmission rate of the second method is less than the upper limit of the transmission rate of the second method that is defined in advance (S402), if the current transmission rate of the second method is increased. The upper limit value of the transmission rate of the second method may be appropriately set by the user.

As a result of the determination in process of S402, in a case where the increased transmission rate of the second method is less than the upper limit value of the transmission rate of the predetermined second method (S402; Yes), the control unit 101 determines to increase the minimum value of the current transmission rate of the second method (S403).

As a result of the determination in process of S402, in a case where the increased transmission rate of the second method is equal to or greater than the upper limit of the transmission rate of the second method that is defined in advance (S402; No), the control unit 101 determines not to change the current transmission rate of the second method (S404).

On the other hand, in a case where the number of the unit periods of time included in the predetermined period of time in which the proportion of the amount of communications traffic of the second method is equal to or greater than the first threshold value is less than the predetermined number (S401; No) as a result of the determination in the process of S401, the control unit 101 compares the proportion of the amount of communications traffic of the second method of each of the plurality of unit periods of time included in the predetermined period of time extracted by the process of S303 with a second threshold, and determines whether a number of unit periods of time in which the proportion of the amount of communications traffic of the second method is equal to or less than the second threshold is equal to or greater than the predetermined number (S405). The second threshold is a value indicating a predetermined proportion of the amount of communications traffic of the second method, and the second threshold is different from the first threshold. The second threshold is smaller than the first threshold. The second threshold can be appropriately set by the user. In addition, the predetermined number of the unit periods of time may be set in advance, or may be set as appropriate by the user. In the process of S405, the predetermined number of unit periods of time to be compared for the determination may be the same as or different from the predetermined number of the unit periods of time to be compared for the determination in the process of S401 described above.

In a case where the number of unit periods of time included in the predetermined period of time in which the proportion of the amount of communications traffic of the second method is equal to or less than the second threshold is equal to or greater than the predetermined number (S405; Yes) as a result of the determination in the process of S405, the control unit 101 determines whether or not the current transmission rate of the second method is the lower limit of the transmission rate of the second method that is defined in advance (S406). The lower limit of the transmission rate of the second method may be appropriately set by the user.

On the other hand, in a case where the number of the unit periods of time included in the predetermined period of time in which the proportion of the amount of communications traffic of the second method is equal to or less than the second threshold is less than the predetermined number (S405; No) as a result of the determination in the process of S405, the control unit 101 determines not to change the current transmission rate of the second method (S404).

In a case where the current transmission rate of the second method is not the lower limit of the transmission rate of the second method that is defined in advance (S406; No) as a result of the determination in the process of S406, the control unit 101 determines to lower the minimum value of the current transmission rate of the second method (S407).

In addition, in a case where the current transmission rate of the second method is the lower limit of the transmission rate of the second method defined in advance (S406; Yes) as a result of the determination in the process of S406, the control unit 101 determines not to change the current transmission rate of the second method (S404).

As described above, the control unit 101 automatically determines the transmission rate of the second method to be set next based on the proportion of the amount of communications traffic of the second method in the total of the amount of communications traffics of the first method and the amount of communication traffics of the second method. As a result, it is possible to set an appropriate multicast transmission rate according to the usage environment without using a complicated operation of setting the communication rate in consideration of the radio usage environment used by the user himself/herself.

In the above, the method of changing the setting of the transmission rate of the second method, that is, the transmission rate of communication using the multicast method or the broadcast method has been described. However, the reception rate of the communication of the second method may be changed at the same time as the setting of the transmission rate is changed. For example, when the control unit 101 determines to increase the minimum value of the transmission rate of the second method in the setting determination process (S403), it may determine to increase the minimum value of the reception rate supported at the same time. Also, when the control unit 101 determines to lower the minimum value of the transmission rate of the second method (S407), it may be determined to lower the minimum value of the reception rate supported at the same time.

Furthermore, the control unit 101 may simultaneously change the setting of the transmission rate of the first method or may simultaneously change the setting of the reception rate of the first method in addition to the setting of the transmission/reception rate of the second method. By changing the setting of the transmission/reception rate of the first method in addition to the setting of the transmission/reception rate of the second method, it is possible to reduce the gap in the communicable distance of transmission and reception in the communication using the first method and the communication using the second method.

In the case where the minimum value of the transmission rate of the second method is increased, the control unit 101 gradually increases the transmission rate to a predetermined upper limit. In addition, in a case where the minimum value of the transmission rate of the second method is lowered, the control unit 101 gradually lowers the transmission rate to a predetermined lower limit. For example, assume that the lower limit of the transmission rate of the second method is 1 Mbps, the upper limit is 12 Mbps, and the transmission rate of the second method can be selected from among 1 Mbps, 2 Mbps, 5 Mbps, 6 Mbps, 9 Mbps, 11 Mbps and 12 Mbps. In this case, in a case where the current transmission rate of the second method is 1 Mbps and the control unit 101 determines to increase the minimum value of the transmission rate of the second method in the setting determination process (S403), the control unit 101 sets the next transmission rate of the second method to 2 Mbps. In a case where the current transmission rate of the second method is 11 Mbps and the control unit 101 determines to lowers the minimum value of the transmission rate of the second method in the setting determination process (S406), the control unit 101 sets the next transmission rate of the second method to 9 Mbps.

The first threshold and the second threshold used in the processes of S401 and S405 may be set in advance or may be variable depending on a number of the wireless communication terminals 200 connected to the access point 100.

Hereinafter, a specific example of the communication control process executed by the control unit 101 of the access point 100 will be described. The communication control processing described here is an example of the present embodiment, and the present embodiment is not limited to the communication control processing described below.

In the communication control processing described below, the control unit 101 changes the setting of the transmission rate of the second method every day (24 hours), and sets 3 a.m. as the set time. In addition, it is assumed that the amount of communications traffic of the second method is acquired every 30 minutes (1800 seconds) in one day. That is, it is assumed that a length of the unit period of time (a seconds) of S201 in FIG. 2 is 1800 seconds (a=1800). In addition, it is assumed that a period of time considered for determining a transmission rate of communication using the second method, that is, a length of a predetermined period of time is 288000 seconds (8 hours). This is the predetermined period of time equivalent to 16 unit periods of time (1800 seconds). It is assumed that the transmission rate of the second method is selected from among 1 Mbps, 2 Mbps, 5

Mbps, 6 Mbps, 9 Mbps, 11 Mbps and 12 Mbps. Further, it is assumed that the current transmission rate of the second method is 1 Mbps.

FIG. 6 shows an example of the proportion (%) of the amount of communications traffic of the second method recorded by the control unit 101 from the start of the communication control process. The control unit 101 may acquire the proportion (%) of the amount of communications traffic of the second method by calculating the proportion of the amount of communications traffic of the second method to the total of the amounts of communications traffic of the first method and the communications traffic of the second method in each unit period of time, that is 1800 seconds as an example. The control unit 101 records the proportion of the amount of communications traffic of the second method for each of the plurality of unit periods of time until the set time for changing the setting of the transmission rate of the second method is reached. FIG. 6 shows the proportion of the amount of communications traffic of the second method recorded from 3:00 on the previous day to 2:30 on the current day.

When the set time (3:00 on the current day) is reached, the control unit 101 determines the transmission rate of the second method to be set next on the basis of the proportion of the amount of communications traffic of the second method for each of the plurality of unit periods of time in 24 hours recorded until the set time is reached. Hereinafter, the processing executed by the control unit 101 will be described in association with the setting change process described with reference to FIG. 3 and the setting determination process described with reference to FIG. 4 and FIG. 5.

When the set time (3:00 a.m. on the current day) is reached, the control unit 101 acquires the proportion of the amount of communications traffic of the second method for each of the plurality of unit periods of time in 24 hours recorded from 3:00 on the previous day to 2:30 on the current day (S301).

Next, the control unit 101 sets a predetermined period of time based on the unit period of time (the time length of the unit period of time) and the proportion of the amount of communications traffic of the second method in each of the plurality of unit periods of time acquired by process of S301 (S302). Here, it is assumed that the period of time considered for determining the transmission rate of the communication using the second method, that is, the length of the predetermined period of time is 288000 seconds (8 hours). Therefore, the control unit 101 extracts the unit periods of time equal to 288000 seconds in which the proportion of the amount of communications traffic of the second method in each of the plurality of unit periods of time is relatively large, and sets the extracted unit periods of time as the predetermined period of time. Since the length of each of the plurality of unit periods is 1800 seconds, the control unit 101 extracts 16 unit periods of time (288000/1800) in which the proportion of the amount of communications traffic of the second method in each unit period of time is relatively large as a predetermined period of time.

Referring to FIG. 6, the proportions of the amount of communications traffic of the second method in 288000 seconds (8 hours) recorded from 8:30 on the previous day to 16:00 on the previous day are relatively large. Therefore, the period of time from 8:30 on the previous day to 16:00 on the previous day is set as the predetermined period of time.

Next, the control unit 101 extracts the proportions of the amount of communications traffic of the second method in each of the unit periods of time from 8:30 on the previous day to 16:00 on the previous day (S303). The control unit 101 determines whether or not a number of the unit periods of time in which the extracted proportion of the amount of communications traffic of the second method is equal to or greater than the first threshold is equal to or greater than the predetermined number (S401). As an example, it is assumed that the first threshold is 90% and the predetermined number is eight. Among the proportions of the amount of communications traffic of the second method in each of the unit periods of time from 8:30 on the previous day to 16:00 on the previous day, the proportions of the amount of communications traffic of the second method recorded from 10:00 on the previous day to 14:30 on the previous day have reached 90%. A period of time from 10:00 to 14:30 on the previous day corresponds to 10 unit periods of time. Therefore, the control unit 101 determines that the number of the unit periods of time in which the proportion of the amount of communications traffic of the second method is equal to or greater than the first threshold is equal to or greater than the predetermined number (S401; Yes).

Next, the control unit 101 determines whether or not an increased transmission rate of the second method is less than the upper limit of the transmission rate of the second method defined in advance if the current transmission rate of the second method is increased (S402). Here, since the current transmission rate of the second method is 1 Mbps and the upper limit of the transmission rate of the second method is 12 Mbps, the control unit 101 determines that the increased transmission rate of the second method is less than the upper limit of the transmission rate of the second method defined in advance (S402; Yes).

As a consequence, the control unit 101 decides to increase the minimum value of the current transmission rate of the second method (S403). Specifically, the control unit 101 decides to change the transmission rate of the second method from the currently set 1 Mbps to 2 Mbps, and reflects the result in the setting (S305).

<Modification>

While an embodiment of the present disclosure has been described above, it should be understood that various changes and modifications can be made by those skilled in the art within the scope of the spirit of the present invention, and that these changes and modifications also fall within the scope of the present invention.

In the embodiment of the present disclosure described above, the transmission rate of the communication using the second method is set based on the ratio between the amount of communications traffic of the first method and the amount of communications traffic of the second method in each of the plurality of unit periods of time as the information indicating the amount of communications traffic of the second method in each of the plurality of unit periods of time, but the present disclosure is not limited to this. In the embodiment of the present disclosure, as the information indicating the amount of communications traffic of the second method in each of the plurality of unit periods of time, the amount of communications traffic of the second method in each of the plurality of unit periods of time, the air time of the communication using the second method in each of the plurality of unit periods of time, or the number of arrival of the frames regardless of the frame size of the communication using the second method in each of the plurality of unit periods of time may be used, and the transmission rate of the communication using the second method may be set based on these.

In the embodiment of the present disclosure described above, the first threshold and the second threshold used in the processes of S401 and S405 may be set in advance, and may be variable depending on the number of the wireless communication terminals 200 connected to the access point 100, but the present disclosure is not limited thereto. In an embodiment of the present disclosure, for example, the first threshold and the second threshold may be set based on a degree of coverage desired by the user.

In addition, in an embodiment of the present disclosure, the first threshold and the second threshold may be determined using a learned model in which an appropriate transmission rate of the second method is learned in advance using a transition of the proportion of the amount of communications traffic of the second method in each of the plurality of unit periods of time as an input.

In an embodiment of the present disclosure, in the setting change process, in the case where the proportion of the amount of communications traffic of the second method in each of the plurality of unit periods of time is acquired, the control unit 101 may not use the proportions of the amount of communications traffic of the second method in unit periods of time recorded on the holiday for the setting change processing. In this case, the control unit 101 may acquire the proportion of the amount of communications traffic of the second method in each of the plurality of unit periods of time recorded on the latest weekday and use the acquired proportions for the setting change processing.

In an embodiment of the present disclosure, the communication rate of the second method on the holiday may be fixed. That is, on the holiday, the control unit 101 may not change the setting of the communication rate of the second method.

In an embodiment of the present disclosure, in the case where the control unit 101 determines to increase the minimum value of the transmission rate of the second method in the setting determination process, and to increase the minimum value of the supported reception rate at the same time, the control unit 101 may determine whether there is a wireless communication terminal connected at the lower limit of the reception rate at that time. If so, the control unit 101 does not change the setting of the minimum value of the supported reception rate. On the other hand, if it does not exist, the control unit 101 increases the minimum value of the supported reception rate.

The above-described embodiments and modifications as one embodiment of the present disclosure can be appropriately combined as long as they do not conflict with each other. Further, a person skilled in the art appropriately adds, deletes, or changes in design of the constituent elements or adds, omits, or changes in conditions of the steps based on the configuration shown in the embodiment are also included in the scope of the invention as long as the gist of the present disclosure is provided.

It is to be understood that other operational effects which are different from the operational effects provided by the aspects of the above-described embodiments, which are obvious from the description of the present embodiment or which can be easily predicted by a person skilled in the art, are naturally provided by an embodiment of the present disclosure.

What is claimed is:

1. A wireless communication device comprising:
   a communication unit configured to communicate with a wireless communication terminal using a first method to transmit data that is receivable by the wireless communication terminal or a second method, different from the first method, to transmit data that is simultaneously receivable by a plurality of wireless communication terminals including the wireless communication terminal;

a processor; and a memory configured to store a program, the program being executable by the processor to cause processor to:

cause the communication unit to communicate, at a first communication rate, using the second method;

obtain first information indicating an amount of communications traffic of the first method in each of a plurality of unit periods of time;

obtain second information indicating an amount of communications traffic of the second method in each of the plurality of unit periods of time;

determine whether to change the first communication rate of the second method by referring to both of (i) the obtained first information indicating the amount of communications traffic of the first method in each of the plurality of unit periods of time and (ii) the obtained second information indicating the amount of communications traffic of the second method in the each of the plurality of unit periods of time, wherein to determine whether to change the first communication rate of the second method, the processor:

acquires a proportion of the amount of communications traffic of the second method in the each of the plurality of unit periods of time, the proportion of the amount of communications traffic of the second method in the each of the plurality of unit periods of time being acquired using the following formula:

$$X = B / (A + B),$$

where X is the proportion of the amount of communications traffic of the second method in the each of the plurality of unit periods of time, A is the amount of communications traffic of the first method in the each of the plurality of unit periods of time, and B is the amount of communications traffic of the second method in the each of the plurality of unit periods of time, and determines whether to change the first communication rate of the second method based on the acquired proportion of the amount of communications traffic of the second method; and cause, in a case where it is determined that the first communication rate of the second method is to be changed, the communication unit to communicate at a second communication rate of the second method different from the first communication rate.

2. The wireless communication device according to claim 1, wherein the processor is caused to determine whether to change the first communication rate of the second method by calculating a ratio between the amount of communications traffic of the first method and the amount of communications traffic of the second method in the each of the plurality of unit periods of time.

3. The wireless communication device according to claim 1, wherein the program, when executed, further causes the processor to:

set a predetermined period of time based on the each of the plurality of unit periods of time and the proportion of the amount of communications traffic of the second method in the each of the plurality of unit periods of time;

compare the proportion of the amount of communications traffic of the second method for the each of the plurality of unit periods of time in the predetermined period of time with a predetermined threshold; and determine whether to change the first communication rate of the second method based on a comparison result of comparing the proportion of the amount of communications traffic of the second method for the each of the plurality of unit periods of time in the predetermined period of time with the predetermined threshold.

4. The wireless communication device according to claim 3, wherein the program, when executed, further causes the processor to set the predetermined threshold according to a number of wireless communication terminals connected to the communication unit.

5. The wireless communication device according to claim 4, wherein:

the predetermined threshold includes a first threshold and a second threshold different from the first threshold; and the program, when executed, further causes the processor to determine whether to change the first communication rate of the second method according to a number of unit periods of time in which the proportion of the amount of communications traffic of the second method is equal to or greater than the first threshold or equal to or less than the second threshold.

6. The wireless communication device according to claim 3, wherein the plurality of unit periods of time in the predetermined period of time are continuous periods of time or discontinuous periods of time.

7. The wireless communication device according to claim 1, wherein the first method is a unicast method, and the second method is a multicast method or a broadcast method.

8. A communication control method executed by a wireless communication device, the communication control method comprising:

communicating with a wireless communication terminal using a first method to transmit data that is receivable by the wireless communication terminal or a second method, different from the first method, to transmit data that is simultaneously receivable by a plurality of wireless communication terminals including the wireless communication terminal;

communicating, at a first communication rate, using the second method;

obtaining first information indicating an amount of communications traffic of the first method in each of a plurality of unit periods of time;

obtaining second information indicating an amount of communications traffic of the second method in each of the plurality of unit periods of time;

determining whether to change the first communication rate of the second method by referring to both of (i) the obtained first information indicating the amount of communications traffic of the first method in each of the plurality of unit periods of time and (ii) the obtained second information indicating the amount of communications traffic of the second method in the each of the plurality of unit periods of time, wherein determining whether to change the first communication rate of the second method includes:

acquiring a proportion of the amount of communications traffic of the second method in the each of the plurality of unit periods of time, the proportion of the amount of communications traffic of the second method in the each of the plurality of unit periods of time being acquired using the following formula:

$$X = B/(A + B),$$

where X is the proportion of the amount of communications traffic of the second method in the each of the plurality of unit periods of time, A is the amount of communications traffic of the first method in the each of the plurality of unit periods of time, and B is the amount of communications traffic of the second method in the each of the plurality of unit periods of time, and determining whether to change the first communication rate of the second method based on the acquired proportion of the amount of communications traffic of the second method; and changing, in a case where it is determined that the first communication rate of the second method is to be changed, the first communication rate of the second method to a second communication rate different from the first communication rate.

9. The communication control method according to claim 8, wherein whether to change the communication rate of the second method is determined by calculating a ratio between the amount of communications traffic of the first method and the amount of communications traffic of the second method in the each of the plurality of unit periods of time.

10. The communication control method according to claim 8, wherein determining whether to change the first communication rate of the second method comprises:

setting a predetermined period of time based on the each of the plurality of unit periods of time and the proportion of the amount of communications traffic of the second method in the each of the plurality of unit periods of time;

comparing the proportion of the amount of communications traffic of the second method for the each of the plurality of unit periods of time in the predetermined period of time with a predetermined threshold; and determining whether to change the first communication rate of the second method based on a comparison result of comparing the proportion of the amount of communications traffic of the second method for the each of the plurality of unit periods of time in the predetermined period of time with the predetermined threshold.

11. The communication control method according to claim 10, wherein the predetermined threshold is set according to a number of wireless communication terminals connected to the wireless communication device.

12. The communication control method according to claim 11, wherein:

the predetermined threshold includes a first threshold and a second threshold different from the first threshold; and determining whether to change the first communication rate of the second method based on the comparison result includes changing the first communication rate of the second method according to a number of unit periods of time in which the proportion of the amount of communications traffic of the second method is equal to or greater than the first threshold or equal to or less than the second threshold.

13. The communication control method according to claim 10, wherein the plurality of unit periods of time in the predetermined period of time are continuous periods of time or discontinuous periods of time.

14. The communication control method according to claim 8, wherein the first method is a unicast method, and the second method is a multicast method or a broadcast method.

15. A non-transitory computer-readable storage medium having stored thereon a program for causing a computer to execute operations comprising:

communicating with a wireless communication terminal using a first method to transmit data that is receivable by the wireless communication terminal or a second method, different from the first method, to transmit data that is simultaneously receivable by a plurality of wireless communication terminals including the wireless communication terminal;

communicating, at a first communication rate, using the second method;

obtaining first information indicating an amount of communications traffic of the first method in each of a plurality of unit periods of time;

obtaining second information indicating an amount of communications traffic of the second method in each of the plurality of unit periods of time;

determining whether to change the first communication rate of the second method by referring to both of (i) the obtained first information indicating the amount of communications traffic of the first method in each of the plurality of unit periods of time and (ii) the obtained second information indicating the amount of communications traffic of the second method in the each of the plurality of unit periods of time, wherein determining whether to change the first communication rate of the second method includes:

acquiring a proportion of the amount of communications traffic of the second method in the each of the plurality of unit periods of time, the proportion of the amount of communications traffic of the second method in the each of the plurality of unit periods of time being acquired using the following formula:

$$X = B/(A + B),$$

where X is the proportion of the amount of communications traffic of the second method in the each of the plurality of unit periods of time, A is the amount of communications traffic of the first method in the each of the plurality of unit periods of time, and B is the amount of communications traffic of the second method in the each of the plurality of unit periods of time, and determining whether to change the first communication rate of the second method based on the acquired proportion of the amount of communications traffic of the second method; and changing, in a case where it is determined that the first communication rate of the second method is to be changed, the first communication rate of the second method to a second communication rate different from the first communication rate.

*    *    *    *    *